(12) United States Patent
Muller et al.

(10) Patent No.: US 9,833,955 B2
(45) Date of Patent: Dec. 5, 2017

(54) METHOD AND DEVICE FOR UNPACKING A COMPONENT (71) Applicant: EXONE GMBH, Augsburg (DE)

(72) Inventors: Alexander Muller, Diedorf-Vogelsang (DE); Rainer Hochsmann, Langenneufnach (DE)

(73) Assignee: ExOne GmbH, Gersthofen (DE)

( * ) Notice: Subject to any disclaimer, the term of this patent is extended or adjusted under 35 U.S.C. 154(b) by 324 days.

(21) Appl. No.: 14/410,672

(22) PCT Filed: Jul. 9, 2013

(86) PCT No.: PCT/EP2013/064501
§ 371 (c)(1),
(2) Date: Jun. 1, 2015

(87) PCT Pub. No.: WO2014/009376
PCT Pub. Date: Jan. 16, 2014

(65) Prior Publication Data
US 2015/0258744 A1 Sep. 17, 2015

(30) Foreign Application Priority Data
Jul. 9, 2012 (DE) .......................... 10 2012 106 141

(51) Int. Cl.
*B29C 71/00* (2006.01)
*B33Y 10/00* (2015.01)
(Continued)

(52) U.S. Cl.
CPC ............ *B29C 71/0009* (2013.01); *B22C 9/10* (2013.01); *B29C 64/165* (2017.08); *B29C 64/35* (2017.08); *B33Y 10/00* (2014.12); *B33Y 30/00* (2014.12); *B33Y 40/00* (2014.12); *B22C 9/02* (2013.01); *B22F 3/1055* (2013.01); *B22F 2003/1059* (2013.01); *B29C 2071/0027* (2013.01);
(Continued)

(58) Field of Classification Search
CPC .................................................... B29C 64/153
See application file for complete search history.

(56) References Cited

U.S. PATENT DOCUMENTS

2002/0090410 A1   7/2002   Tochimoto et al.
2004/0084814 A1   5/2004   Boyd et al.
(Continued)

FOREIGN PATENT DOCUMENTS

DE        10158169 B4    2/2007
DE    102007048385 B3    1/2009
(Continued)

*Primary Examiner* — Ryan Ochylski
(74) *Attorney, Agent, or Firm* — Thomas Lizzi (57) ABSTRACT

Disclosed is a method for unpacking a component 11, produced by means of an additive manufacturing process, from a particulate material fill 9 of loose, unconsolidated particulate material, which is arranged together with the component 11 in a construction space 5 and surrounds the component 11. In order to unpack the component 11, the particulate material fill 9 surrounding the component 11 is transferred into a fluidized bed, so that the loose, unconsolidated particulate material is fluidized, and the fluidized, unconsolidated particulate material is drained downward off the construction space 5. In addition, a device for use in the method is described.

16 Claims, 4 Drawing Sheets (51) Int. Cl.
*B33Y 30/00* (2015.01)
*B33Y 40/00* (2015.01)
*B22C 9/10* (2006.01)
*B29C 64/165* (2017.01)
*B29C 64/35* (2017.01)
*B22F 3/105* (2006.01)
*B22C 9/02* (2006.01)

(52) U.S. Cl.
CPC ............. *Y02P 10/24* (2015.11); *Y02P 10/292* (2015.11); *Y02P 10/295* (2015.11)

(56) References Cited

U.S. PATENT DOCUMENTS

2007/0001342 A1\* 1/2007 Oberhofer ................ B22C 7/00
264/237
2010/0044547 A1 2/2010 Higashi et al.

FOREIGN PATENT DOCUMENTS

| JP | 2002-205338 A | 7/2002 |
| JP | 2003-266548 A | 9/2003 |

\* cited by examiner

METHOD AND DEVICE FOR UNPACKING A COMPONENT

The present invention relates to a method and a device for unpacking a component produced by means of an additive manufacturing method from a particulate material fill of loose, unconsolidated particulate material surrounding the component.

There are numerous additive manufacturing methods in which the component to be produced is constructed in layers from a particulate material/powder material. In this regard, the respective particulate material layer is selectively solidified in a predetermined partial area thereof, so that the component may be constructed from selectively solidified partial areas lying one upon another and overlapping at least in part. By way of example, reference is made for example to so-called three-dimensional printing or selective laser sintering. Additive manufacturing methods (or methods of production in layers) include, in addition to the so-called rapid prototyping, for example also a so-called rapid tooling or a so-called rapid manufacturing. The component to be produced may, for example, be a mold or a foundry core. The particulate material may, for example, be sand. However, it should be understood that also other particulate material may be used and other components may be produced by means of the method.

In the production of such powder-based components in layers, the objects to be produced are embedded into loose particulate material during the construction process. Towards the end of the construction process, the (at least one) component is thus surrounded by a particulate material fill of loose particulate material. Following the manufacturing process, the component has to be removed from the particulate material fill or has to be separated from the loose, unconsolidated particulate material; this is referred to as the so-called "unpacking" of the component. This so-called unpacking of the component may be followed by a (fine) cleaning thereof, so as to remove adhering particulate material residues. In this regard, unconsolidated particulate material (or "unbound" particulate material) refers to particulate material outside the solidified partial area of a respective layer, i.e., for example, particulate material outside the printing or sintering area of a respective layer or unprinted or unsintered particulate material.

Unpacking may, for example, take place by sucking-off the loose particulate material by means of a high-performance suction device. For this purpose, following for example the completion of a component or following the completion of the construction process, a first object is exposed from above by means of a suitable suction device (for example a so-called suction lance or a suction hose) until it can be removed from the construction box, for example by hand. Then, the next object is suctioned free, removed, etc. In this case, an operator has to expose and remove all components sequentially. As the case may be, several components may be suctioned free at the same time in one plane, and then removed.

In this respect, the time-consuming suctioning of the loose particulate material by means of the suction device is unfavorable. This applies especially to the case of a large construction space or a large construction box in which a large volume of unconsolidated particulate material is received. Especially in the case of suctioning by hand, there is a further risk that objects may be damaged by being contacted with the suction device. Automation of the suction process, for example in such a way that suctioning of the particulate material is effected by means of a robot arm, is possible only with considerable effort, since new and complex sequence programming in the robot is required for new objects. Another drawback of the suctioning method is that the particulate material may be collected in a container after suctioning with high effort only. This usually occurs in a separator or in a suitable separating device which separates the particulate material form the suction flow/air flow. Another drawback is that all components contacting the particulate material to be suctioned (for example suction lance, suction hose, separator, etc.) are subject to extensive wear, in particular in the case of highly abrasive particulate material, such as sand.

The component may, for example, be constructed on a so-called construction platform, so that the particulate material fill and the component received therein are arranged on the construction platform at the end of the construction process. The construction platform, on the other hand, may be received in a so-called construction box. For easily pourable particulate material or a well pourable particulate material fill, and in the case of a comparatively small construction box, it may be sufficient in this regard to open selectively closable through-holes formed in the construction platform for freeing the component from sand or for unpacking the component from the particulate material fill, so that the loose particulate material falls/trickles downward out of the construction space. In certain cases, the particulate material may thus drain off/trickle out in a sufficient way without any further loosening (for example by means of vibration). In many cases, however, the loose particulate material only drains off in an area directly above the respective opening, so that cavities are formed above the respective opening, in which case no more particulate material drains off (so-called "bridge formation" above the respective opening). In these cases, the particulate material has to be loosened, for example by means of vibration, without damaging the component. This might be a problem/involve some difficulties, especially in the case of a large construction box. In addition, only a certain part of the loose particulate material can be discharged using this method, and a great residual amount of particulate material might remain in the construction box.

For example, WO 2007/139938 A2 (see therein, for example, FIGS. 3A to 3C) discloses the use of two perforated plates arranged at a vertical distance to each other, the holes of which are arranged to be offset with respect to each other in a horizontal direction. A vacuum is applied at the lower side of the lower perforated plate after constructing the object, and the particulate material is thus suctioned downwards. The two perforated plates may be configured to be movable in a vertical direction or in a horizontal direction relative to each other. In other words, the upper perforated plate forms a construction platform having outlet openings, wherein the outlet openings are closed (during the construction process) by the lower perforated plate which is offset. A disadvantage of this embodiment is, for example, that particulate material which tends to bridging (see above) cannot be discharged reliably in this way. Hollow spaces may be formed above the suction openings due to the suctioning from below, and the material above the hollow spaces no longer drains off. Under certain circumstances, the formation of bridges may be avoided or solved by strong vibrations, for example at the lateral construction box wall or the construction platform. However, these vibrations may be disadvantageous for the components, and component damages may easily arise in this regard.

US 2008/0241404 A1 also discloses a construction platform which is configured so as to discharge unconsolidated particulate material downward through the construction platform out of the construction chamber. See therein, for example, FIG. 1. According to US 2008/0241404 A1, the construction platform comprises a screen or grid member, the openings of which are closed by lower flaps during the construction process. By opening the flaps after the construction process, unconsolidated particulate material can be discharged from the construction chamber, insofar as it is sufficiently pourable.

Numerous other unpacking methods are known. For example, US 2001/0045678 A1 (see therein, for example, FIGS. 5A to 7C) discloses to provide the construction platform with a grid or screen member. At the end of the construction process, together with the powder fill, which is arranged thereon and in which the component is embedded, the grid member is displaced laterally out of the construction space into a separate post-treatment chamber where the component is unpacked. For this purpose, the grid member is arranged on rolls in the post-treatment chamber, which move the grid member to and fro, so as to generate vibrations and thus to shake off the unconsolidated particulate material. Moreover, a blower is provided in the post-treatment chamber, so as to blow against the component from above. Two separate chambers are used in this context, namely a construction chamber and a post-treatment chamber, the particulate material fill having to be moved from one chamber into the other chamber before the actual unpacking.

US 2002/00 90 410 A1 discloses an unpacking method in which, on the one hand, air is blown-in laterally (on a first side) and, on the other hand, construction material is laterally withdrawn by suction (on a second side opposite the first side) through the lateral construction space wall or the vertical circumferential wall of the construction space (or the construction box). According to US 2002/0090410 A, unconsolidated particulate material is sucked laterally, combined with a lateral blowing of the unconsolidated particulate material. For this purpose, the lateral wall and thus the entire construction box must be dimensioned to be correspondingly high, since the lateral openings for blowing-in/suctioning should be positioned under the construction platform and the grid member, respectively, during the construction process. In addition, the component is constructed on a grid member, and particulate material may fall down through holes of the grid member during the unpacking process of the component, after the openings of the grid member have been released by moving downward a height-adjustable platform. A supporting vibration is proposed as well, so as to increase flowability of the particulate material.

Another unpacking method is known from WO 2005/025780. This document proposes to displace the construction platform into a suctioning position after producing the component, and to subsequently unpack the component by means of a lateral suction flow, whereby the unconsolidated construction material is to be removed and the formed body and the carrier or the construction platform are to be cooled. The lateral wall and thus the entire construction box have to be dimensioned to be correspondingly high in this case as well.

WO 01/10631 A2 discloses a construction platform which is configured to be porous or which is provided with openings, wherein a gas is blown-in from the bottom through the pores and the openings, respectively, which generates a kind of fluidized bed and loosens up the powder surrounding the object produced. The loose particulate material is removed upwards from the construction space, for example by means of moving the construction platform upwards in connection with tilting the construction space. See for example FIGS. 3 and 4 of WO 01/10631 A2. Removing the construction material through the upper opening of the construction space is a complex and complicated matter, especially in the case of a large dimensioned construction space; in addition, tilting the construction space if a fluidized bed is present may result in that the components migrate in the fluidized bed and, for example, impact/collide with one another or with a circumferential wall of the construction space, which may result in damaging the components.

It is an object of the present invention to provide a method and a device which allow a simple but nevertheless reliable removal of the loose particulate material respectively a simplified removal of the component from the particulate material fill (or from the construction space or the construction box in which the component and the particulate material fill are received), for example also for a large construction space or a large construction box.

It is an alternative or additional object of the present invention to provide a method and a device which allow a fast unpacking of the component from the particulate material fill, for example also for a large construction space or a large construction box.

It is an alternative or additional object of the present invention to provide a method and a device which allow a gentle unpacking of the component from the particulate material fill, i.e. by which the possibility of damaging the component can at least be reduced, for example also for a large construction space or a large construction box.

It is an alternative or additional object of the present invention to provide a method and a device by means of which unpacking the component from the particulate material fill may be automated easily and readily or may take place in a controlled way.

It is an alternative or additional object of the present invention to provide a method and a device by means of which the component can be unpacked even/also from a poorly pourable particulate material fill, for example also for a large construction space or a large construction box.

It is an alternative or additional object of the present invention to provide a method and a device by means of which the component can be reliably unpacked from a relatively large construction space as well.

It is an alternative or additional object of the present invention to provide a method and a device by means of which the particulate material separated from the component can be collected easily, for example in order to use the particulate material again.

It is an alternative or additional object of the present invention to provide a method and a device by means of which wear and tear of devices contacting the particulate material, occurring during the unpacking process, can be kept at a low level.

It is an alternative or additional object of the present invention to provide a method and a device by means of which unpacking may take place in a comparatively low construction box.

In order to solve at least one of these objects, the invention provides a method for unpacking a component according to claim 1 and a device according to claim 14. Further embodiments of the method according to the invention and of the device according to the invention are described in the dependent claims.

The invention describes a method for unpacking a component produced by means of an additive manufacturing method from a particulate material fill of loose, unconsolidated particulate material, which fill is arranged in a construction space together with the component and surrounds the component, wherein, for unpacking the component, the particulate material fill surrounding the component is transferred into a fluidized bed, so that the loose, unconsolidated particulate material is fluidized/is present in a fluidized form, and the fluidized, unconsolidated particulate material is drained downwards off the construction space.

The component may, for example, be manufactured by means of a three-dimensional printing method, alternatively, for example, by means of selective laser sintering. However, other additive manufacturing methods are imaginable/possible as well, for example powder-based manufacturing methods. Those skilled in the art are well acquainted with manufacturing methods of this type, and these methods are, for example, described in the above documents. For example, the component may be constructed in layers from the particulate material/powder material in the construction space (please note that the construction space according to claim 1, in which the fill is received together with the component, may but does not necessarily have to be identical to the construction space (including the delimitation thereof) in which the component is previously produced). In this respect, the respective particulate material layer may selectively be consolidated in a predetermined partial area thereof, so that the component can be constructed from selectively consolidated/solidified partial areas lying one upon the other and overlapping at least in part. For example, the component to be manufactured may be constructed in layers from particulate material by first applying a first particulate material layer onto a so-called construction platform in a construction space. The construction space may be circumferentially delimited by a lateral, vertical circumferential wall and may be open upwards. The construction space may be delimited by the construction platform downwards. The construction platform may be received in the circumferential wall, for example in a height-adjustable way. For example, the construction space may be formed/defined by a so-called construction box which may, for example, be movable, for example by means of its own construction box travel drive integrated into the construction box (alternatively, the construction box may be configured to be stationary). After applying the first particulate material layer to the construction platform by means of a so-called coater, the first particulate material layer may selectively be consolidated/solidified in a partial area thereof, for example by imprinting a suitable binding agent, for example by means of a suitable printing device. Then, the construction platform may be lowered downward by one layer thickness, a second particulate material layer may be applied to the first particulate material layer, and the second particulate material layer may selectively be consolidated in a partial area thereof. These steps may be repeated until the component is completed. A suitable printing device, a suitable coater, a suitable construction box and a suitable plant for use in such a method, respectively, are, for example, described in the following applications/patents, the disclosure content of which is incorporated herein by this reference: DE 10 2009 056 695, DE 10 2009 056 688, DE 10 2009 056 689, DE 10 2009 056 686, DE 10 2009 056 696, DE 10 2009 056 694, and DE 10 2009 056 687.

One or more components may be arranged in the particulate material fill at the end of the construction process/manufacturing process. Several components may, for example, be arranged in a common horizontal layer or plane within the construction space (in which case they have been manufactured at the same time or next to each other) and/or may be arranged in a vertical direction one upon the other within the construction space (in which case they have been manufactured one after another).

Thus, the at least one component may be made of consolidated particulate material (respectively of selectively consolidated partial areas of successive particulate material layers), and may, for example, be a mold or a foundry core, for example a sand mold or a sand foundry core.

The particulate material or construction material may, for example, comprise sand particles. For example, sand particles may be used for the particulate material, which are selected from the group consisting of quartz sand particles, aluminum oxide sand particles, zircon sand particles, olivine sand particles, silicate sand particles, chromite sand particles and combinations thereof. The particulate material may, however, comprise other construction particles, for example metal or synthetic material particles, so that the invention is not limited to the use of sand particles. The particulate material may have construction particles having an average particle size of 90 to 250 µm, for example an average particle size of 90 to 200 µm, for example an average particle size of 110 to 180 µm. In addition to so-called construction particles of which the component is primarily composed, the particulate material may also comprise additives, for example a powdery component of a multi-component binder.

After production of the at least one component in the construction space, the component is thus embedded in a particulate material fill, for example surrounded by loose respectively unconsolidated particulate material towards one or more or all sides (on the circumferential side, upwards, downwards). The at least one component can now be sufficiently freed from the unconsolidated particulate material in a so-called unpacking step. In other words, the component can be exposed in a sufficient way. In this regard, the term unconsolidated particulate material refers to particles which are not connected with other particles, thereby forming the component, i.e., particles outside the respective, selectively consolidated partial area of a layer. After unpacking or rather draining off unconsolidated particulate material, the objects/components may be removed from the construction space or the construction box, for example manually or in an automated way (for example by means of a gripping device or a robot).

According to the invention, for unpacking the component, the particulate material fill surrounding the component is transferred into a fluidized bed, so that the loose, unconsolidated particulate material is fluidized/is present in a fluidized form, and the fluidized, unconsolidated particulate material is drained downwards off the construction space.

The solid/packed particulate material existing available after the manufacturing process is thus loosened and brought into a fluidized state (for example entirely), so that the formerly solid particulate material fill is now fluidized and thus has fluid-like or liquid-like characteristics. In the fluidized state or fluidized bed state, the unconsolidated particulate material may easily be drained downward through corresponding drain through-holes off the construction space, for example drained off freely (for example, without application of a vacuum). Even otherwise poorly/hardly pourable particulate material fills can easily be separated from the component after fluidization or rather transfer into the fluidized bed thereof, and components can reliably be unpacked even from comparatively large construction spaces or a particulate material fill arranged therein.

For example, the particulate material may not be drained off the construction space until the fluidized bed is formed. It is, however, also possible to drain off the loose particulate material in parts already before there is a fluidized bed (as far as possible), for example to let it trickle out of the drain openings as far as possible. Then, the remaining particulate material may be fluidized (by generating the fluidized bed), and the particulate material present in a fluidized form can then be drained off.

In the unpacking process of the (at least one) component according to the invention, for example at least such an amount of unconsolidated particulate material of the particulate material fill may be drained off the construction space that the (at least one) component can then, i.e. after the unpacking process, be gripped (manually or in an automated way) and be removed from the construction space. For example, at least a part, for example a predominant part of the component is exposed after the unpacking process, i.e. is no longer covered by unconsolidated particulate material. In the unpacking method, the component is thus exposed in a sufficient way. In the unpacking process according to the invention, a predominant part (more than half) of the unconsolidated particulate material of the particulate material fill may, for example, be drained off the construction space. For example, small amounts of unconsolidated particulate material may remain in the construction space.

Those skilled in the art are well acquainted with a fluidized bed and its generation. In this respect, a solid/packed or resting fill/bad is flown-through by a fluid bottom-up; in this regard, the fill changes into the fluidized bed as from a particular flow velocity (so-called fluidizing point). If the flow velocity were further increased, the particles would be conveyed pneumatically as from a particular point or at a particular flow velocity, i.e. the particles would be discharged upwards out of the construction space. The loose particulate material fluidized bed has a greater volume when compared to the solid or resting particulate material fill of loose particulate material, or has a greater height in the construction space. Components with a greater density than the bed may sink downward in the fluidized bed.

The fluidized bed may be formed/remain formed or be present (intermittently or at a stretch) for example during the entire unpacking process or, for example, at least over a predominant period of the entire unpacking process. I.e., the method according to the invention covers, for example, a case in which the particulate material fill is present in the form of a fluidized bed at least during a time period of unpacking (i.e., the fluidized bed is maintained) and particulate material of the particulate material fill/fluidized bed fluidized in this way is drained downwards off the construction space.

According to the invention, the fluidized, unconsolidated particulate material is drained downwards off the construction space. Thereby, the unconsolidated particulate material may be drained off the construction space reliably and quickly, especially in the case of large construction spaces. A lateral draining-off or removal of the construction material through an upper opening of the construction space may be dispensed with for example completely. The construction platform may, for example, remain in a lower area of the construction space in which it is arranged after constructing the component anyway.

Thus, the component can first be produced in the construction space and can then be unpacked from this construction space in a reliable way. In this respect, the construction space may be formed by a movable construction box which, after constructing the component in a corresponding plant, is moved out therefrom and into an unpacking station. There, the component can be unpacked reliably and safely using the method according to the invention. Alternatively, the unpacking process may also take place directly in the plant for constructing the component or in the construction position of the construction box.

According to the invention, the construction space is delimited downward by a construction platform (for example a construction platform received in the construction space or in the construction box in a height-adjustable way), on/above which the particulate material fill containing the component is arranged, the fluidized, unconsolidated particulate material being drained off downwards through the construction platform. Thus, the construction platform is configured as a particulate material drain bottom. The construction platform may be an integral part of the construction box and may be integrated into the latter.

I.e., the component may first be manufactured on the construction platform, for example by applying the construction material/particulate material to the construction platform in layers, thereby forming layers lying one upon another, and by dosed application of a flowable binding agent onto a partial area predetermined for the respective layer before applying a subsequent layer, the particles of the construction material being connected to each other by means of the binding agent in the predetermined partial area. After having been produced, the component and the particulate material fill surrounding the component are arranged on/above the construction platform, and the fluidized, unconsolidated particulate material can be drained off downward through the construction platform. In other words, the unconsolidated particulate material can flow/trickle downward through the construction platform off the construction space. The unconsolidated particulate material or a sufficient or predominant part of it can thus be separated from the component and can be removed from the construction space efficiently and reliably.

Then, the component may be removed from the construction space, for example manually or in an automated way, for example after the construction platform has been moved somewhat upward, if necessary (fluidization of the particulate material fill occurs, for example, with a construction platform moved downward). The component removed from the construction space may then be subject to further cleaning or further treatment steps.

One or more particulate material drain through-holes are formed in the construction platform, which can be closed and opened electively/selectively by means of a closing mechanism, wherein the one or more particulate material drain through-holes are opened by means of/by operating the closing mechanism for draining the fluidized, unconsolidated particulate material, so that the fluidized, unconsolidated particulate material drains off downward through the one or more particulate material drain through-holes. During the manufacturing process, the one or more drain through-holes may be closed by means of the closing mechanism, so that the successive particulate material layers can be formed on the construction platform safely and reliably. Thus, the construction platform may, for example, be formed by a perforated plate or may comprise such plate, in which one or more drain through-holes are formed (vertically or extending in a thickness direction of the plate). By means of the closing mechanism, the through-holes of the perforated plate/construction plate may selectively be closed and opened, respectively. Those skilled in the art basically know such a closing mechanism, for example from US 2008/0241404 (flaps) or WO 2007/139938 A2 (two perforated plates arranged one upon the other and offset relative to each other). It may be sufficient to form/provide one single drain through-hole in the construction platform, for example in the center thereof. In order to ensure a rapid and uniform draining, several drain through-holes may be formed in the construction platform. For example, several drain through-holes may be distributed evenly across the construction platform. For example, several particulate material drain through-holes may be combined in individual groups/arrangements of adjacent drain through-holes, which in turn are distributed evenly across the construction platform.

The closing mechanism may, for example, comprise a perforated sheet or a perforated plate which is arranged (substantially) parallel to the construction platform (for example above or below the construction platform, for example adjacent thereto or at a small distance therefrom), comprises one or more through-holes (for example a number of through-holes corresponding to the number of particulate material drain through-holes) and can be moved, relative to the construction platform, for example in a horizontally and/or vertically movable way, between a closing position (in which the particulate material drain through-holes are blocked or closed; for example in which particulate material present in the construction space is prevented by the perforated sheet or by the perforated plate (for example directly or indirectly by particulate material accumulated/banked thereon (for example in the form of a bulk cone)) from draining off downward through the one or more particulate material drain through-holes) and an opening position (in which the particulate material drain through-holes are released; for example in which particulate material present in the construction space may drain off downward through the one or more particulate material drain through-holes and the one or more through-holes), wherein the perforated sheet or the perforated plate is moved relative to the construction platform into the opening position, so as to let the fluidized, unconsolidated particulate material drain off downward through the one or more particulate material drain through-holes.

Alternatively, the closing mechanism may comprise one or more rotary disks which are arranged rotatably underneath or on the lower side of the construction platform, which are each rotatably movable between a first rotational position and a second rotational position (for example around their own axis (rotation upon itself)) and each comprise a plurality of through-holes, which are aligned with a plurality of associated particulate material drain through-holes in the first rotational position and which are covered by the construction platform in the second rotational position, so that the associated particulate material drain through-holes are closed (by the rotary disk), wherein the one or more rotary disks are rotated from the second rotational position into the first rotational position, so as to open the particulate material drain through-holes and let the fluidized, unconsolidated particulate material drain off downward through the particulate material drain through-holes and the through-holes. One single rotary disk, for example a rotary disk arranged in center relative to the construction platform, may be sufficient. However, several rotary disks may be provided as well. These may be evenly distributed across the construction platform. Several rotary disks may be coupled mechanically, so as to be movable together from the second into the first rotational position, for example by means of a linear drive. The mechanical coupling may be effected by means of a rod mechanism of hinged rods. Several rotary disks may be coupled by a push/pull rod, for example by a respective connecting arm being hinged both to the associated rotary disk and the rod. The push/pull rod may be connected to a linear drive which drives/moves the push/pull rod, so as to move the coupled rotary disks together between the first and the second rotational positions. Several push/pull rods may be coupled by a cross-connection or a crossbar, which is driven by the linear drive. The rotary disk or the rotary disks may be supported downward by another plate or sheet, which serves as reinforcing plate or reinforcing sheet, for example in order to protect the rotary disks from deflection during the construction process.

As a further alternative, the closing mechanism may comprise a number of closures corresponding to the number of particulate material drain through-holes, which are formed to selectively close and release a respectively associated particulate material drain through-hole, and which are movable to and fro relative to the construction platform vertically and/or horizontally between a closing position, in which the respective closure closes the associated particulate material drain through-hole, and an opening position, in which the respective closure releases the associated particulate material drain through-hole, wherein the closures are moved from the closing position into the opening position relative to the construction platform, so as to let the fluidized, unconsolidated particulate material drain off downward through the one or more particulate material drain through-holes. The closures may, for example, be movable to and fro from the closing position to the opening position together, for example by being connected/coupled mechanically, for example by a rod assembly or a plate. The closures may, for example, be arranged underneath the construction platform. All or several (i.e. at least part) of the closures may, for example comprise/be plugs or stoppers, which in the closing position are arranged in the associated particulate material drain through-hole (at least in part) and thereby prevent the particulate material from draining off, and which are movable from the closing position in a vertical direction downward into the opening position. In this respect, the stoppers may seal directly against at least a part of the respective circumferential hole wall (or abut against said wall) in the closing position, or may alternatively form an annular gap relative thereto/therewith, which is small enough to prevent the particulate material from draining off (for example since the annular gap does not let pass any particulate material or since the annular gap is filled by particulate material or is plugged or since the annular gap results in/contributes to the generation of a conical heap which is formed underneath the construction platform and prevents the particulate material from (further) draining). For example, if the closures are formed as plugs, it may be advantageous to configure the respectively associated particulate material drain through-hole in the shape of a cone, the respective opening being tapered upward. In this context, the respective stopper may, for example, also be formed to be cone-shaped, for example contrary to the associated hole. For example, the respective plug may be made of rubber. In addition or alternatively, all or several (i.e. at least a part) of the closures may, for example, be/comprise covers/lids or disks which in the closing position cover the associated particulate material drain through-hole at least in part and thereby prevent the particulate material from draining, and which are movable from the closing position in a vertical and/or horizontal direction into the opening position.

However, another suitable closing mechanism may be used as well.

According to an alternative or additional embodiment, the fluidized, unconsolidated particulate material drains downward through the construction platform or the particulate material drain holes thereof off the construction space in a suction-free manner. In other words, the particulate material is not withdrawn by suction. That is, no vacuum or suck is applied to the particulate material drain through-holes, but the fluidized, unconsolidated particulate material drains off/flows freely through the particulate material drain through-holes, for example exclusively due to gravity. The particulate material can thus be drained off/separated from the component only by opening/releasing the particulate material drain through-holes. Both a vacuum generating device and corresponding connecting hoses from the vacuum generating device to the particulate material drain through-holes can be saved, and the component can nevertheless be unpacked in a reliable way. For example, the particulate material may flow into a collecting vessel arranged underneath the construction space, in which the unconsolidated particulate material separated from the component is collected (for example, the particulate material may fall or trickle into the collecting vessel directly and freely from the particulate material drain through-holes). From there, the unconsolidated particulate material can be returned or recycled to the manufacturing process (additive manufacturing process, for example rapid prototyping method for manufacturing a component), for example following an optional particulate material processing step.

According to an alternative or additional embodiment, for unpacking the component, the fluidized, unconsolidated particulate material is drained downward off the construction space predominantly or exclusively through the above-described construction platform or the particulate material drain through-holes thereof. In other words, the particulate material is not drained off laterally for unpacking the component, i.e. not through the vertical side wall/circumferential wall of the construction box. Hereby, a complex configuration of the construction box may be avoided. The inner side of the lateral wall/circumferential wall of the construction box may thus be configured free from holes, i.e. no holes have to be provided on the inner side of the lateral wall/circumferential wall, and especially no particulate material drain through-holes. For example, lateral blowing and/or suctioning can be dispensed with completely when using the method according to the invention, but the component can nevertheless be unpacked in a reliable way. For example, the particulate material may drain or trickle into a collecting vessel arranged underneath the construction space, in which the unconsolidated particulate material, separated from the component, is collected. As already mentioned above, the unconsolidated particulate material may be returned or recycled to the manufacturing process (additive manufacturing process, for example rapid prototyping method for manufacturing a component) from there, for example following an optional processing step.

Generally, the particulate material may be drained or trickle into a collecting vessel arranged underneath the construction space, in which the unconsolidated particulate material, separated from the component, is collected. The construction material collected in this way may be disposed of or reused/recycled, for example by means of a conveyor, for example a screw conveyor.

Fluidization of the particulate material fill or transfer of the particulate material fill into the fluidized bed occurs through or starting from the construction platform, so that the construction platform is configured at the same time as fluidization bottom and as particulate material drain bottom. For unpacking the component, the loose particulate material is thus fluidized or transferred into the fluidized bed starting from or through the construction platform, and is drained off the construction space in the fluidized state or the fluidized bed state through the construction platform at the same time/simultaneously. For example, a fluid stream is introduced upwards through the construction platform and a particle stream is drained off through the construction platform at the same time.

I.e., according to the invention, the construction platform is configured as a so-called fluidization bottom, i.e. the construction platform is adapted to transfer the particulate material fill arranged thereabove into a fluidized bed. Both the fluidization of the particulate material solid fill and the draining of the fluidized particulate material thus occur through the construction platform and starting therefrom, respectively, especially at the same time. Such fluidization bottom may comprise fluidizing means, for example fluid injection nozzles and/or fluid flow-through pores; see below. The fluidizing means may be distributed evenly across the construction platform and/or may be arranged between the drain through-holes respectively the groups of drain through holes (for example between the rotary disks).

Thus, according to an exemplary embodiment, fluid for fluidizing the particle fill may be introduced through the construction platform into the particulate material fill, and fluidized, unconsolidated particulate material may be drained off downward through the particulate material drain through-holes of the construction platform at the same time.

The particulate material fill is transferred into a fluidized bed using a (pressure) fluid. In order to generate the fluidized bed, the fluid is introduced into the particulate material fill from below, through the construction platform in such a way (for example at such a pressure or such a flow velocity) that the particulate material fill is flown-through by the fluid bottom-up, and that the loose, unconsolidated particulate material is loosened by means of the fluid and is fluidized, thereby forming a fluidized bed. Optionally, fluid may be blown laterally into the fill as a support. The fluid may, for example, be a gas or a gas mixture. For example, the fluid may be or contain air. For example, the fluid may be or contain inert gas. The fluid may be tempered, so as to cool or heat the particulate material fill and the component contained therein, respectively. The pressure or the flow velocity or the volume flow of the fluid supplied to the construction space may be regulated or controlled, especially in such a way that the particulate material fill is transferred into the fluidized bed and is kept in the fluidized bed state at least for a predetermined period of time (for example a predominant period of time) during the unpacking process.

For this purpose, the construction platform (or the fluidization bottom) may comprise a plurality of fluid inlet openings (for example formed by pores or nozzles or channels), through which the fluid is introduced into the fill from the construction platform. For example, the construction platform (or the fluidization bottom) may comprise a plurality of fluid injection nozzles/introduction nozzles, by means of which the fluid is introduced into the particulate material fill. For example, a plurality of fluid injection nozzles may be integrated into the construction platform. For example, the fluid injection nozzles are distributed evenly across the construction platform. Alternatively or in addition, the construction platform may be formed to be porous at least in sections, and the fluid may be introduced into the particulate material fill through pores of the construction platform. I.e., the construction platform may, for example, be made of a porous material, for example of a porous sintered plate. Alternatively, the construction platform may comprise one or more porous inserts (for example porous sintered inserts), which are inserted into corresponding recesses of the construction platform and are, for example, distributed evenly across the construction platform. The pores and/or the outlet openings of the nozzles may be configured/dimensioned in such a way that particulate material of the fill does not fall downward through the pores and the outlet openings of the nozzles, respectively. I.e., the pores and/or the outlet openings of the nozzles may be dimensioned to be smaller than the particles of the fill. The pores and/or the outlet openings of the nozzles do therefore not have to be closed during the component's manufacturing process, and may be used to introduce fluid into the fill and into the construction space, respectively, during the manufacturing process (for example, in order to cool or to heat the fill or in order to discharge particular components from the fill). As a further alternative, through-channels may be provided in the thickness direction of the construction platform, the respective opening of which, facing the fill, is closed by a screen which prevents the particles from falling through, but enables the fluid to flow upwards.

The fluid may, for example, be pressurized by means of a compressor or a pump, and may then be supplied to the construction space, for example through the pores and/or the nozzles. Alternatively, the fluid may also be taken from a pressure tank and may then be supplied to the construction space, for example through the pores and/or the nozzles.

As already mentioned above, the flow velocity or the pressure of the fluid supplied to the construction space for unpacking the component may be controlled/set/regulated in such a way that the loose, unconsolidated particulate material is loosened by means of the fluid and is fluidized, thereby forming the fluidized bed. For example, the flow velocity or the pressure of the fluid supplied to the construction space is controlled/set/regulated during the entire or at least during the predominant part of the unpacking process in such a way that the fluidized bed is generated and maintained. A fluidized bed is then present during the entire or at least during the predominant part of the unpacking process.

It may be required/appropriate to reduce the flow velocity or the pressure of the fluid gradually during the unpacking process (with a decreasing height of the particulate material fill and the fluidized bed, respectively), so that an upward discharge of the particulate material is avoided. For example, the construction box may stand on weighing cells, so as to determine the weight of the construction box and of the particulate material fill contained therein, respectively, and the flow velocity or the pressure of the fluid can be controlled/set/regulated according to the weight determined. Alternatively, a filling-level sensor may, for example, be provided, which scans/detects the height of the particulate material fill.

The fluid may, for example, be supplied continuously (for example at a constant or continuously decreasing pressure) and/or in an impulse-free way.

Alternatively, fluid may be introduced into the particulate material fill from below in an impulsive way, thereby generating several chronologically successive fluid impulses, for example in a pulsed or clocked way. Hereby, inhomogeneities and different/varying turbulences may be brought into the particulate material fill and the fluidized bed, respectively, whereby particulate material present in border areas and/or component undercuts may be fluidized in an even better way. The fluid impulses may have a constant or a varying frequency. The fluid impulses may be equally strong or may have a different strength.

According to an embodiment of the invention, the fluidization means of the fluidization bottom (i.e., for example the fluid injection nozzles and/or the pores) are released by the closing mechanism at least when the particulate material drain through-holes are open, i.e. the fluidization means of the fluidization bottom (for example the fluid injection nozzles and/or the pores) are not blocked or covered by the closing mechanism if the particulate material drain through-holes are open.

According to another embodiment of the invention, the fluidization means of the fluidization bottom (i.e., for example the fluid injection nozzles and/or the pores) are released by the closing mechanism both if the particulate material drain through-holes are open and if they are closed. Hereby, the fluidization means of the fluidization bottom may also be used during the construction process/manufacturing process of the component. In addition, the fluidized bed may be generated hereby before the particulate material drain through-holes are opened, i.e. in this case there is already a fluidized bed and thus particulate material capable of flowing when the particulate material drain through-holes are opened/released.

In addition to the fluid, further measures may be used for loosening the particulate material fill. For example, acoustic waves might be used additionally or a vibration device might be used additionally, which causes vibrations of the circumferential wall and/or the construction platform. However, the method according to the invention may be carried out without such additional measures.

The above method for unpacking a component may be combined with a method for manufacturing one or more components by means of an additive manufacturing process, wherein in the additive manufacturing process in a plan view all components are produced next to each other in the construction space (i.e. not one above the other), for example in one single horizontal component layer. Thereby, it is possible to avoid damaging of the components when draining the fluidized particulate material, for example due to the fact that a falling/sagging of a component onto a component lying thereunder is avoided.

In addition or as an alternative, the component or one or more or all of the components may comprise a respective support or holding structure which is formed together with the respective component in the additive manufacturing method, whereby, upon unpacking the components, when the fluidized, unconsolidated particulate material is drained downward off the construction space, a damaging of the respective component and/or a covering of one or more of the above particulate material drain through-holes by the component is avoided. I.e., not only the component but also its support or holding structure is produced by means of the additive manufacturing method.

For example, a component may be provided with component legs, so that the component may be supported on the construction platform by its legs and may safely land thereon, respectively.

For example, one or more holding frames may further be formed in the additive manufacturing method, where respectively one or more components are held through their respective support or holding structure. A holding frame of this type may support the component for example by material closure/bond or in a form-fit way. In this respect, reference is made to the published German patent application DE 10 2007 033 434 A1 (→closure/bond), as well as to the German patent application with the application number 10 2011 051 347.7, according to which a co-formed holding frame and the respective component are engaged, thereby forming an annular gap (for example a cap-shaped gap) in which unconsolidated particulate material is received, so that the component is held at the holding frame free of play (i.e., the particulate material received in the annular gap remains in the annular gap also once the component has been unpacked). A holding frame of this type makes it easier to remove the component from the construction box; however, it may also contribute to a controlled or targeted sagging of the component and/or to protecting the component during the unpacking process.

For example, several components may be connected to each other by their respective support or holding structure. Thus, it is possible to prevent these components from falling on top of each other or from knocking against each other.

The component and one or more or all of the components, respectively, may be connected to the above construction platform through their respective support or holding structure and/or may be supported thereon.

The present invention further provides a device for use in any one of the above methods (a so-called unpacking device), the device comprising: a construction box having a vertical circumferential wall by which a constructing space arranged in the interior space of the construction box is delimited on a circumferential side, a construction platform delimiting the construction space downward (the construction platform may, for example, be received in the construction box or the circumferential wall, for example in a height-adjustable way; alternatively, the circumferential wall may be arranged on the construction platform and may, for example, be co-formed during the construction process), wherein in the construction platform one or more particulate material drain through-holes are formed for draining fluidized, unconsolidated particulate material off the construction box, and a closing mechanism configured to electively/selectively close and open the one or more particulate material drain through-holes, a fluidized bed generating device adapted to transfer the particulate material fill surrounding the component into a fluidized bed, so that the loose, unconsolidated particulate material is fluidized and the fluidized, unconsolidated particulate material can be drained downward off the construction space, as well as a control device configured (for example programmed) so as to control the fluidized bed generating device for unpacking the component in such a way that it transfers the particulate material fill surrounding the component into a fluidized bed, so that the loose, unconsolidated particulate material is fluidized and the fluidized, unconsolidated particulate material can be drained downward off the construction space.

The control device may, for example, be configured (for example programmed) so as to control the fluidized bed generating device for unpacking the component in such a way that it transfers the particulate material fill surrounding the component into the fluidized bed and maintains the fluidized bed for a predetermined period of time. The control device may, for example, be configured (for example programmed) so as to control the fluidized bed generating device for unpacking the component in such a way that it transfers the particulate material fill surrounding the component altogether (for example at a stretch or intermittently) for at least half of the entire unpacking process (or the entire unpacking duration) into the fluidized bed (for example greater than or equal to 70% of the duration, for example greater than or equal to 80% of the duration, for example greater than or equal to 90% of the duration).

The control device may further be configured (for example programmed) so as to control the closing mechanism for unpacking the component in such a way that it opens/releases the one or more particulate material drain through-holes, so that the fluidized, unconsolidated particulate material can drain downward off the construction space, for example into a collecting vessel arranged under the construction space, where the unconsolidated particulate material, separated from the component, is collected. Releasing the particulate material drain through-holes from the (previous) closing position may, for example occur shortly before, at the same time as or shortly after fluidization of the particulate material fill, i.e., the control device may first control the fluidized bed generating device, or it may control the fluidized bed generating device and the closing mechanism at the same time, or it may first control the closing mechanism. Under certain circumstances it may be advantageous not to release the particulate material drain through-holes until the particulate material is/has been fluidized, as the closing mechanism can be opened/handled more easily in this case due to the reduced weight weighing thereon.

In addition or alternatively, the one or more particulate material drain through-holes may, for example, be formed to be suction device-free, so that, after opening the particulate material drain through-holes, the fluidized, unconsolidated particulate material may drain off the construction box in a suction-free manner through the particulate material drain through-holes. I.e., the particulate material drain through-holes according to this embodiment are not fluid-connected with a vacuum generating device and with a suction device, respectively. For example, a particulate material collecting vessel may be provided under the construction box, which is open upwards, the particulate material freely trickling from the particulate material drain through-holes into the collecting vessel (for example in free fall, for example merely as a result of gravity, for example, no pipes are provided between the particulate material collecting vessel and the particulate material drain through-holes).

In addition or alternatively, the inner side of the vertical circumferential wall may be configured free from particulate material drain through-holes, so that, for unpacking the component, the fluidized, unconsolidated particulate material is discharged from the construction space exclusively downward, for example into the collecting vessel arranged underneath the construction space, in which the unconsolidated particulate material separated from the component is collected. An elaborate and complex closing mechanism for selectively closing outlet openings formed in the circumferential wall is therefore not required.

In addition or alternatively, the closing mechanism may be configured as described above with respect to the method (one or more rotary disks or perforated sheet/perforated plate or closures).

The fluidized bed generating device may comprise a fluidization bottom formed by the construction platform, from which or through which bottom the particulate material fill surrounding the component can be transferred into a fluidized bed. In other words, the fluidization bottom or construction platform is adapted to transfer the particulate material fill into a fluidized bed, for which purpose the fluidization bottom comprises so-called fluidization means. For this purpose, the fluidization bottom may, for example comprise fluid injection nozzles and/or fluid injection pores; see below. Thus, the construction platform serves at the same time (or is rather configured correspondingly) to drain off particulate material therethrough, and to fluidize/swirl the particulate material fill. The construction platform thus forms part both of the draining mechanism and the fluidization mechanism respectively the fluidized bed generating device.

The fluidized bed generating device comprises a fluid injection device/introducing device which, for generating the fluidized bed, is adapted to inject/introduce a fluid through the construction platform, into the particulate material fill from below in such a way that the particulate material fill is flown-through by the injected/introduced fluid bottom-up and the loose, unconsolidated particulate material is loosened and fluidized by means of the injected/introduced fluid, thereby forming a fluidized bed.

The control device may, for example be configured (for example programmed) to control the fluidized bed generating device or the fluid injection device/introducing device for unpacking the component in such a way that it injects/introduces the fluid through the construction platform, into the particulate material fill from below at such a pressure or such a flow velocity that the particulate material fill is flown-through by the injected/introduced fluid bottom-up and the loose, unconsolidated particulate material is loosened and fluidized by means of the injected/introduced fluid, thereby forming the fluidized bed. In other words, a pressure or flow velocity or volume flow control/regulation may for example be provided for the fluid to be supplied to the construction space in the control device.

The fluid injection device may, for example, comprise a plurality of fluid injection nozzles which are integrated into the construction platform (or the fluidization bottom) and adapted to introduce the fluid through the construction platform into the particulate material fill.

In addition or alternatively, the construction platform (or the fluidization bottom) may be configured to be porous at least in sections, thereby partially forming the fluid injection device, so that the fluid may be introduced into the particulate material fill through the pores of the construction platform. In this case, a fluid chamber may be formed underneath the construction platform, into which the pressurized fluid is supplied and from which the fluid is introduced into the particulate material fill through the pores of the construction platform.

The fluid injection device may further (in addition to the fluidization bottom and the fluid injection nozzles and/or pores, respectively) comprise, for example, a device for pressurizing a fluid ("pressurized fluid source"), for example a compressor or a pump or a pressure tank receiving pressurized fluid. In addition, the fluid injection device may, for example, comprise a corresponding pipe system which fluid-connects the pressure fluid source and the fluidization bottom (or the fluid injection nozzles and/or the pores) and which may, for example, contain one or more closing or regulating devices (for example one or more valves).

In addition or alternatively, the control device may further be configured to control the fluid injection device in such a way that it introduces the fluid for unpacking the component into the particulate material fill from below in an impulsive way, thereby generating several chronologically successive fluid impulses, for example in a pulsed or clocked way, so as to loosen and fluidize the fluid, thereby forming the fluidized bed. Hereby, inhomogeneities or irregularities may be generated.

The closing mechanism may be configured in such a way that the fluidizing means of the fluidization bottom, for example the fluid injection nozzles and/or the pores are released both if the particulate material drain through-holes are open and closed. The construction platform and the fluidizing means of the fluidization bottom, respectively, may thus be used also during the construction process, for example so as to introduce a process gas into the construction space (then, however, with lower pressure).

Further characteristics and advantages of the present invention are illustrated or described in detail in the attached drawings incorporated herein, as well as in the following detailed description, which together shall serve to illustrate certain principles of the present invention.

The invention will hereinafter be illustrated in detail based on different embodiments and with reference to the drawings.

In the drawings, FIG. 1a and FIG. 1b schematically illustrate a method and a device for unpacking a component according to a first embodiment of the invention, and FIG. 2a to FIG. 2e schematically illustrate a device for unpacking a component according to a second embodiment of the invention.

Figure 1A:
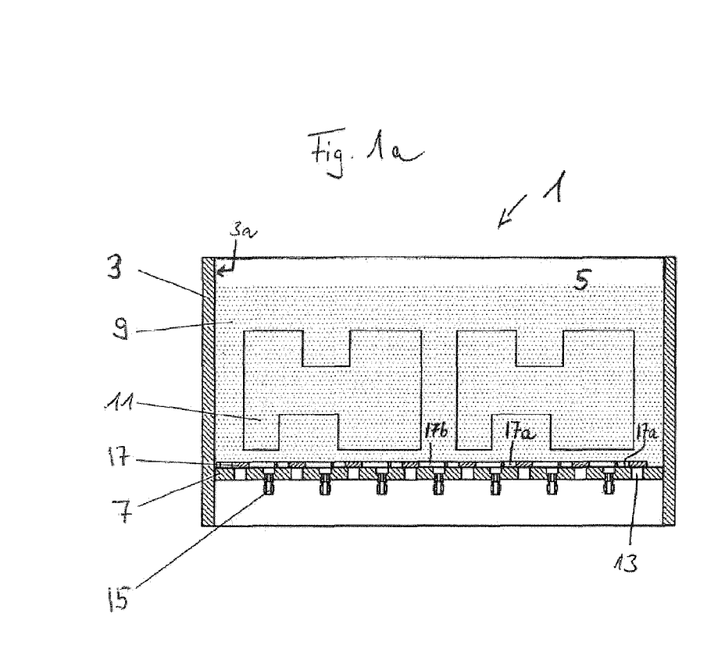

FIG. 1a shows a construction box 1 having a vertical side wall/circumferential wall 3, by which a construction space 5 is delimited on the circumferential side, in which one or more components may be constructed in layers by means of an additive manufacturing method. The side wall 3 and the construction space 5, respectively, may, for example, be formed to be rectangular in a plan view. The construction space 5 and the construction box 1, respectively, are open upwards. The construction space may, however, also be closed upwards by an optional cover which is not shown, while the method according to the invention for unpacking the component is carried out. The construction space 5 is delimited downwards by a construction platform 7 received in the construction box 1 in a height-adjustable way. In other words, the construction platform 7 forms the bottom of the construction space 5. In the construction space 5 and the construction box 1, respectively, a particulate material fill 9 of loose, unconsolidated particulate material, here loose sand, is received on/above the construction platform 7. Several components 11 are embedded in the particulate material fill 9, here as an example two foundry cores. Of course, only one component 11 may be embedded in the particulate material fill 9 as well.

The construction platform 7 comprises a plurality of particulate material outlet/drain through-holes 13. The construction platform 7 may thus be referred to as a perforated plate. The particulate material drain through-holes 13 may, for example, be drilled into the construction platform 7. The particulate material drain through-holes 13 are dimensioned in such a way that fluidized, unconsolidated particulate material may freely, for example in a suction-free way, drain downwards off the construction space 5 through the (opened) particulate material drain through-holes 13; also see FIG. 1b. The particulate material drain through-holes 13 are, for example, distributed across the construction platform 7 in such a way that the fluidized particulate material may drain off uniformly and quickly.

According to this embodiment of the invention, the unconsolidated particulate material is neither blown out nor suctioned through the particulate material drain through-holes 13 (nor anywhere else), but unconsolidated particulate material is fluidized and freely drains off the construction space 5 and the construction box 1, respectively, in the fluidized state or in the fluidized bed state, merely due to gravity and without suctioning or without applying a vacuum to the particulate material outlet through-holes 13, for example exclusively through the particulate material drain through-holes 13. Therefore, the vertical side wall 3 of the construction space 5 and the construction box 1, respectively, is formed without any holes according to this embodiment of the invention.

Figure 1B:
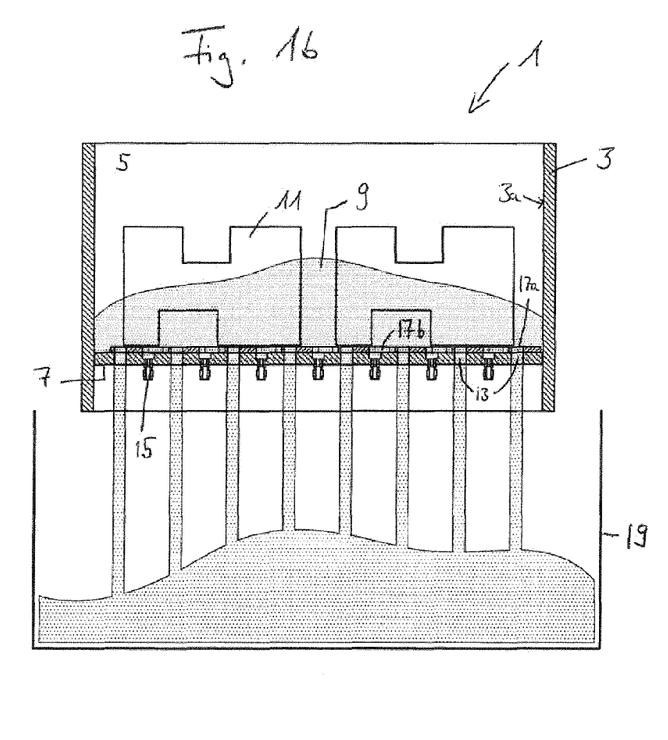
Figure 2A:
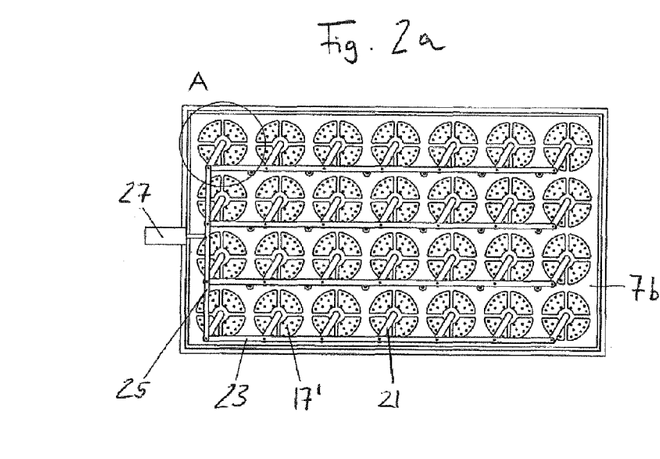
Figure 2B:
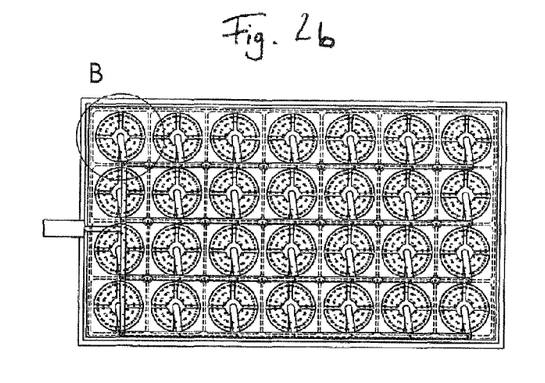
Figure 2C:
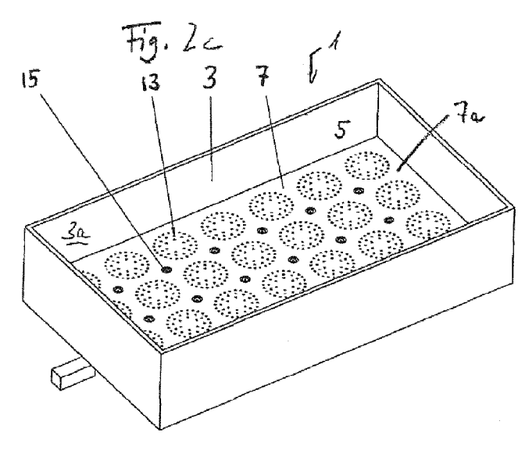
Figure 2D:
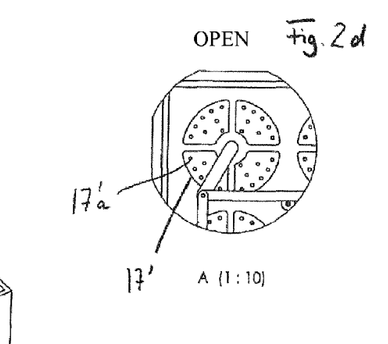
Figure 2E:
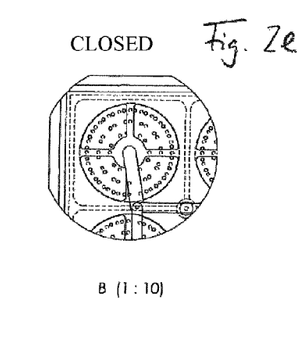

As implied by FIG. 1*b*, a collecting vessel 19, for example a collecting tray, which is open upwards, may be arranged underneath the construction space 5 and the construction box, respectively, into which the unconsolidated particulate material drains off or trickles as a result of gravity (in free fall).

Here, the construction platform 7 thus serves as a particulate material drain bottom, through which fluidized particulate material may drain off through the particulate material drain through-holes 13 for unpacking the component.

The construction platform 7 further comprises a plurality of fluid inlet openings. Here, the fluid inlet openings are formed by fluid injection nozzles 15 which are received in the construction platform 7 or are integrated therein. For example, the fluid injection nozzles 15 are inserted into corresponding through-holes, for example through-bore holes of the construction platform 7. Using the fluid injection nozzles 15, for example air or another gas or gas mixture may be fed through the construction platform 7, into the particulate material fill from below, so that the particulate material fill is flown-through by the fluid bottom-up and, as a result thereof, is transferred into a fluidized bed. The outlet openings of the fluid injection nozzles 15 or the fluid inlet openings formed thereby are, for example, dimensioned in such a way that the particles of the particulate material fill may not be discharged from the construction space downwards through the fluid inlet openings. For unpacking the two components 11, pressurized air is applied to the fluid injection nozzles 15 or the pressurized air ports implied in FIG. 1*a*, the pressure or the flow velocity of the air flow provided to the fluid injection nozzles 15 and flowing into the particulate material fill being set/controlled/regulated in such a way that the particulate material fill is transferred into a fluidized bed and kept in the fluidized state. For this purpose, the pressurized air ports may be connected through a pipe system which is not shown to a pressurized air source not shown, such as a compressor.

Here, the construction platform 7 therefore additionally serves as a so-called fluidization bottom, by which or rather through which the particulate material fixed bed can be transferred into a particulate material fluidized bed. The fluidization bottom forms part of a fluidized bed generating device, which besides the fluidization bottom or the nozzles 15 integrated into the construction platform 7 may additionally comprise the above-mentioned compressor including the pipe system. Moreover, the fluidized bed generating device may be connected to a control device not shown, which is configured to control the fluidized bed generating device for unpacking the components 11, i.e. in unpacking operation, in such a way that the fluid, here air, is introduced into the particulate material fill at a sufficiently high pressure, so that said fill is transferred into the fluidized bed.

The construction box 1 further comprises a closing mechanism for electively/selectively closing or opening the outlet through-holes 13. In FIG. 1*a*, the outlet through-holes 13 of the construction platform 7 are closed by the closing mechanism, whereas the outlet through-holes 13 of the construction platform 7 are released by the closing mechanism in FIG. 1*b*. The drain through-holes 13 may be closed by means of the closing mechanism during the manufacturing process, so as to apply the particulate material successively and in layers onto the construction platform.

According to this embodiment of the invention, the closing mechanism comprises a perforated sheet or a perforated plate 17, in which a plurality of first through-holes 17*a* and a plurality of second through-holes 17*b* are formed. Here, the number of the first through-holes 17*a* corresponds to the number of outlet through-holes 13 in the construction platform 7. The shape and size of the first through-holes 17*a* may substantially be equal to the shape and size of the outlet through-holes 13. The number of the second through-holes 17*b* corresponds to the number of fluid injection nozzles 15. Here, the respective second through-hole 17*b* is formed to be greater in size than the outlet side/outlet surface of the associated fluid injection nozzle 15 facing the particulate material fill, so that the fluid injection nozzles 15 are released both in the closing position (FIG. 1*a*) and in the opening position (FIG. 1*b*) of the closing mechanism, whereby the nozzles 15 may be applied/used also during the construction process and before opening the drain through-holes 13.

In order to selectively close/open the drain through-holes 13, the perforated plate 17 is moved horizontally. In the opening position (or drain position), the outlet through-holes 13 of the construction platform 7 are aligned with the first through-holes 17*a*, so that construction material or particulate material may trickle out of the construction space. In the closing position (or construction position), the outlet through-holes 13 are, on the other hand, covered by the perforated plate 7. As shown by FIGS. 1*a* and 1*b*, the nozzles 15 are always released by the perforated plate 17.

The above-mentioned and not-shown control device may, in addition, communicate with the closing mechanism, so as to control the closing mechanism in such a way that said mechanism opens/releases the drain through-holes 13 by horizontally moving the perforated plate 17, so as to let the particulate material trickle out, as soon as the fill 9 is present as a fluidized bed.

Operation of the construction box/device shown in FIGS. 1*a* and 1*b* and the unpacking method according to this embodiment of the invention, respectively, shall hereinafter be described in more detail. Following the construction of the two components 11, these components are present in the construction space 5, as shown in FIG. 1, together with the particulate material fill 9 of loose, unconsolidated particulate material and surrounded thereby.

For unpacking the components 11, the particulate material fill 9 is now transferred into a particulate material fluidized bed first, so that the loose, unconsolidated particulate material is present in a fluidized form, and is kept in this fluidized bed state. The fluidized, unconsolidated particulate material is then drained downward off the construction space 5 (in the fluidized bed state), namely through the construction platform 7 or rather its particulate material drain through-holes 13; see FIG. 1*b*.

For this purpose, the particulate material drain through-holes 13 are opened by means of the closing mechanism after the fluidized bed has been formed, for draining the fluidized, unconsolidated particulate material, for which purpose the perforated sheet 17 is moved horizontally from the closing position according to FIG. 1*a* into the opening position according to FIG. 1*b*, so that the fluidized, unconsolidated particulate material drains off, downward through the one or more particulate material drain through-holes 13 and into the collecting vessel 19.

As shown in FIG. 1b, the fluidized, unconsolidated particulate material drains downward off the construction space 5 without any suctioning in this regard. Moreover, the fluidized, unconsolidated particulate material is drained off the construction space 5 exclusively downward according to this embodiment.

In order to generate the fluidized bed, a fluid, here air, is introduced using the nozzles from below into the particulate material fill 9 in such a way that the particulate material fill 9 is flown-through by the fluid bottom-up, and that the loose, unconsolidated particulate material is loosened by means of the fluid and fluidized, thereby forming a fluidized bed. In this respect, the pressure of the fluid is controlled or regulated in such a way according to this embodiment, that the particulate material is transferred into the fluidized bed by the fluid. With the quantity or the height of the particulate material fluidized bed decreasing in the construction space, it can be appropriate to reduce the pressure, so as to prevent the particulate material from being discharged upwards.

In addition, the fluid is introduced into the particulate material fill 9 in an impulsive way from below according to this embodiment, thereby forming several chronologically successive fluid impulses, for example in a pulsed or clocked way, so as to generate inhomogeneities thereby.

According to this embodiment of the invention, the components are constructed or arranged during the manufacturing process in the construction space in such a way that the later unpacking or draining of the fluidized particulate material does not cause any damages of the components, and that the drain through-holes 13 are—at least not entirely—covered by the sinking components 11.

According to the method shown, all components 11 are produced/arranged next to each other in one single component layer when viewed in a horizontal direction (see FIG. 1a), so that sagging of a component onto another one and damages resulting therefrom can be avoided.

If necessary, at least one of the components 11 may comprise a respective support or holding structure (not shown), which is formed along with the respective component 11 in the additive manufacturing process, whereby, when unpacking the components 11, damaging of the respective component 11 and/or covering of one or more particulate material drain through-holes 13 by the component can be avoided when the fluidized, unconsolidated particulate material is drained downward, off the construction space 5.

A support or holding structure of this type may, for example, comprise small legs by which the component 11 can be supported on the construction platform 7 and the perforated sheet 17, respectively (at least in a sagged state). The legs may also serve as spacers with respect to the construction platform 7 and the closing mechanism, respectively.

Alternatively or in addition, one or more holding frames may be formed in the additive manufacturing method as well, where one or more components are respectively held through their respective support or holding structure.

Alternatively or in addition, several components 11 may be connected to each other by their respective support or holding structure, so as to hold the components 11 at a distance to each other in this way.

Alternatively or in addition, at least one component 11 may be connected to the construction platform 7 or the closing mechanism through its support or holding structure or may be supported thereby (for example already before the unpacking process).

In the embodiment shown in FIGS. 1a and 1b, the perforated plate 17 is arranged above the construction platform. This has, for example, the advantage that the particulate material presses against the perforated plate (or the horizontally movable "slider plate") and thereby helps sealing the plate against the construction platform. In addition, only the openings of the (thinner) perforated plate/slider plate and not the through-holes 13 of the (thicker) construction platform are to be filled at the beginning of the construction process.

Figure 3A:
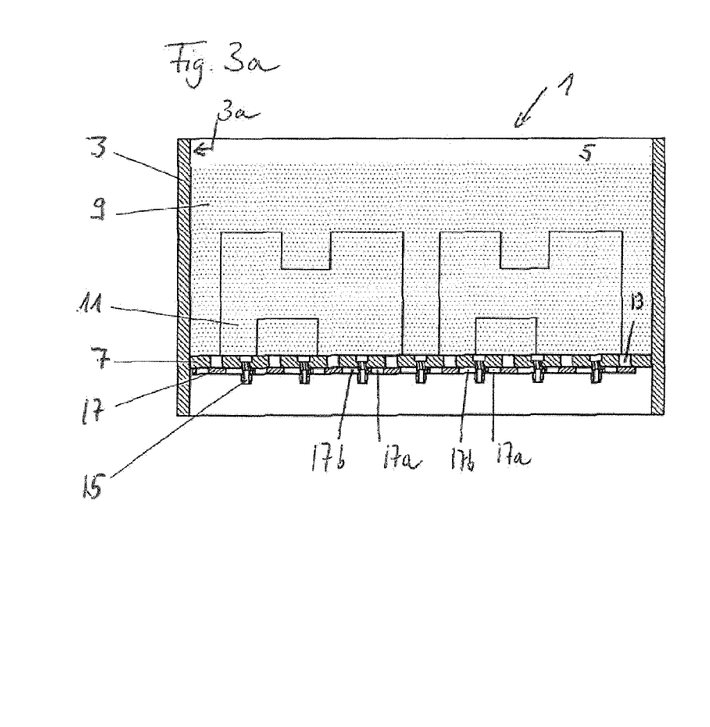
FIG. 3a and FIG. 3b schematically show a method and a device for unpacking a component according to a third embodiment of the invention, which is similar to the first embodiment of the invention. However, according to this embodiment, the perforated plate (for example horizontally movable "slide plate") (co-)forming the closing mechanism is arranged underneath the construction platform.
Figure 3B:
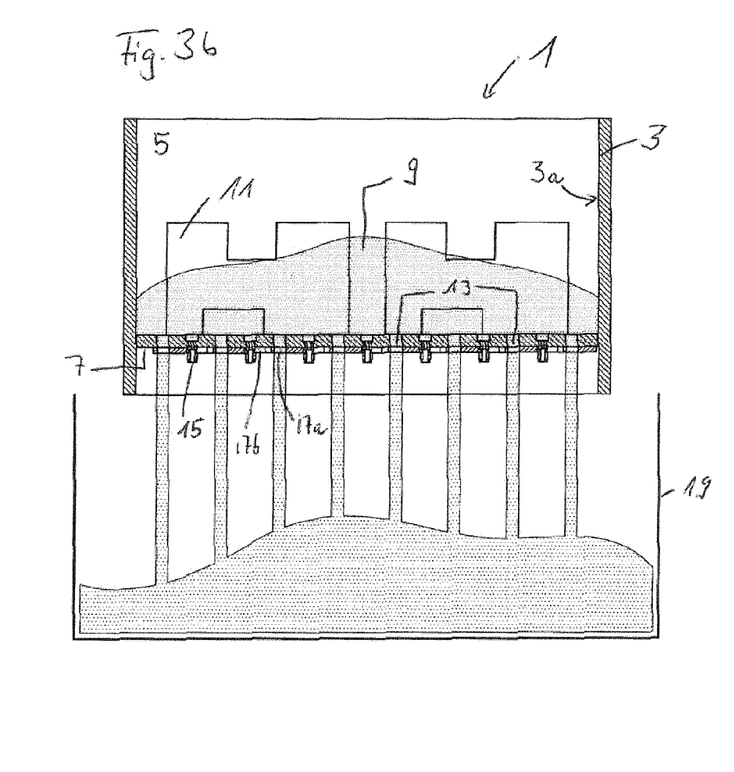

However, the perforated plate 17 may alternatively also be arranged underneath the construction platform, as shown in FIGS. 3a and 3b. This has, for example, the advantage that no direct forces act on components near the slider plate while the perforated plate/slider plate is moved for draining off the particulate material. In this context, a gap may be formed between the perforated plate 17 and the construction platform 7 in FIG. 3a, i.e. the perforated plate does not have to abut directly against the construction platform, wherein the powder material stops on the perforated plate and in the gap, respectively, without trickling out of the openings of the perforated plate.

In both cases mentioned above (horizontal slider plate above or below) the slider plate may be moved in the horizontal plane, for example by means of a connectable drive (for example a servomotor or a lifting magnet), so as to bring the holes 17a and 13 into an aligning position and so as to close the holes 13 by the perforated plate 17, respectively.

If the perforated plate 17 is arranged underneath the construction platform 7, the perforated plate may be formed to be movable in a vertical direction additionally or alternatively. The holes 17a and 13 may then be arranged so as not to be aligned at any time, the holes 17a and the perforated plate 17, respectively, being more far away from the holes 13 and platform, respectively, in a vertical direction in the opening position than in the closing position, so that a respective bulk cone stops before the associated hole 17a in the closing position and reaches the associated hole 17a in the opening position, so that the powder material trickles through the holes 13 and 17a.

According to an alternative embodiment (not shown), the fluid injection nozzles 15 may be replaced entirely or in part by fluid injection pores (hereinafter "pores") which extend through the construction platform 2 in a thickness direction. The fluid is then introduced through the pores into the particulate material fill 9. For this purpose, for example several porous inserts may be inserted in respective holes or boreholes of the construction platform 7, or the entire construction platform may be formed by a porous plate. The porous inserts or the porous plate may, for example, be porous sintered inserts or a porous sintered plate.

Combinations of the above alternative embodiments are possible as well, i.e., for example a construction platform having fluid injection nozzles and/or fluid injection pores.

FIGS. 2a to 2e show a device for unpacking a component manufactured by means of an additive manufacturing method according to a second embodiment of the invention. In this respect, alike or equivalent features are provided with the same reference numbers as in FIGS. 1a and 1b. Hereinafter, mainly the differences with respect to the first embodiment of the invention shall be described.

The device comprises a construction box 1. The construction box 1 has a vertical circumferential wall 3, by which a construction space 5 arranged in the interior space of the construction box 1 is delimited on the circumferential side, a construction platform 7 which delimits the construction space 5 downwards and is received in the construction box 1 and in the circumferential wall 3, respectively, in a height-adjustable way, several particulate material drain through-holes 13 being formed in the construction platform 7 for draining fluidized, unconsolidated particulate material off the construction box 1, and a closing mechanism configured to selectively close and open the particulate material drain through-holes 13.

At least one component may be constructed in the construction box 1 by means of an additive manufacturing process, which component is surrounded by a particulate material fill of unconsolidated particulate material after having been produced (as shown in FIGS. 1a and 1b). The particulate material may be drained off the construction box through the particulate material drain through-holes 13 after having been fluidized, at least to such an extent that the manufactured components are exposed sufficiently in order to be gripped and removed from the construction box 1. The particulate material drain through-holes 13 are combined in groups of particulate material drain through-holes 13 according to this embodiment. See FIG. 2c which shows a top view of the construction platform upper side 7a, and FIG. 2a which shows a top view of the construction platform lower side 7b. According to this embodiment, altogether 28 groups of particulate material drain through-holes 13 are provided. The particulate material drain through-holes 13 are arranged in a circle in the respective group. The groups of particulate material drain through-holes 13 are distributed evenly across the construction platform 7.

According to this embodiment of the invention, the closing mechanism comprises several rotary disks 17', here 28 rotary disks corresponding to the number of groups of particulate material drain through-holes 13. The rotary disks 17' can be seen clearly in FIGS. 2a, 2b, 2d, and 2e. The rotary disks 17' are rotatably suspended from the lower side 7b of the construction platform 7 and are each rotatably movable to and fro between a first rotational position (see FIGS. 2a and 2d) and a second rotational position (see FIGS. 2b and 2e). Each respective rotary disk 17' comprises a plurality of through-holes 17a' which in the first rotational position are aligned with a plurality of associated particulate material drain through-holes 13 of the associated group of particulate material drain through-holes 13 and which in the second rotational position are covered by the construction platform 7 (i.e. are not aligned with the associated particulate material drain through-holes 13 of the associated group), so that the particulate material drain through-holes 13 are closed by the associated rotary disk 17'.

Thus, the rotary disks 17' may be rotated from the second rotational position into the first rotational position, so as to open the particulate material drain through-holes 13 and let the fluidized, unconsolidated particulate material drain off downwards through the particulate material drain through-holes 13 and the through-holes 17a'. The rotary disks are coupled mechanically and can be moved together/at the same time between the first and second positions. For this purpose, several rotary disks 17a' or a row of rotary disks 17a' arranged one after another may be coupled through a push/pull rod 23, for example by a respective connecting arm 21 being hinged both to the associated rotary disk 17' and to the rod 23. Since four rows of rotary disks 17' are provided here, four push/pull rods 23 are provided, which are hinged through a cross connection or crossbar 25. The crossbar 25 is driven by a linear drive 27, so that the linear drive moves the interconnected rotary disks together/simultaneously between the first and second rotational positions through the crossbar 25, the push/pull rods 23 and the respective connecting arm 21. Here, the rotary disks are supported by an optional reinforcing sheet in a downward direction, in which sheet four slits are formed for each rotary disk, which are arranged along a circulate arc and at least mostly expose the holes 17a'.

The unpacking device further comprises a fluidized bed generating device which is adapted to transfer the particulate material fill surrounding the component into a fluidized bed, so that the loose, unconsolidated particulate material is fluidized, and the fluidized, unconsolidated particulate material may be drained downwards off the construction space. Here, the fluidized bed generating device comprises, analogously to the first embodiment, a fluid injection device which is adapted to blow a fluid from below through the construction platform into the particulate material fill for generating a fluidized bed in such a way that the particulate material fill is flown-through by the injected fluid bottom-up, and the loose, unconsolidated particulate material is loosened and fluidized by means of the injected fluid, thereby forming a fluidized bed. Here, the fluid injection device comprises, just like in the first embodiment, a plurality of fluid injection nozzles 15 which are integrated into the construction platform 7 and adapted to introduce the fluid through the construction platform 7 into the particulate material fill. The nozzles are arranged between the groups of drain through-holes 13 and between the rotary disks 17', respectively. The construction platform is thus again configured as a fluidization bottom. Alternatively, the construction platform 7 may be formed to be porous at least in sections, thereby partially forming the fluid injection device, so that fluid may be introduced into the particulate material fill through the pores of the construction platform.

The fluid injection device may, analogously to the first embodiment, further comprise a pressurized air source and a corresponding pipe system for feeding the pressurized air to the nozzles 15.

The unpacking device further comprises a control device (not shown) which is configured so as to control the fluid injection device for unpacking the component in such a way that it transfers the particulate material fill surrounding the component into a fluidized bed, so that the loose, unconsolidated particulate material is fluidized, and the fluidized, unconsolidated particulate material may be drained downwards off the construction space. For example, the control device may be configured to control the fluid injection device in such a way that it feeds/introduces the fluid into the construction space at a predetermined pressure or a predetermined flow velocity. In this regard, the control device may, for example, be configured so as to control the fluid injection device in such a way that it introduces the fluid into the particulate material fill from below in an impulsive way, thereby generating several chronologically successive fluid impulses, for example in a pulsed or clocked way.

The control device may further be configured to control the closing mechanism for unpacking the component in such a way that it opens the particulate material drain through-holes 13, so that the fluidized, unconsolidated particulate material may drain downwards off the construction space 5. I.e., the linear drive 27 may be controlled by the control device.

The particulate material drain through-holes 13 are formed without any suction device according to this embodiment as well, so that, after opening the particulate material drain through-holes 13, the fluidized, unconsolidated particulate material drains off the construction box 5 in a suction-free way through the particulate material drain through-holes 13, for example into a collecting vessel 19 arranged underneath the construction space 5 (as shown in FIG. 1*b* for the first embodiment). The inner side 3*a* of the vertical circumferential wall 3 is configured to be free from particulate material drain through-holes 13 according to this embodiment as well, so that the fluidized, unconsolidated particulate material is exclusively drained downwards off the construction space 5 for unpacking the component. Also according to this embodiment the closing mechanism is configured in such a way that the fluid injection nozzles 15 are released both if the particulate material drain through-holes 13 are open and closed.

Figure 4A:
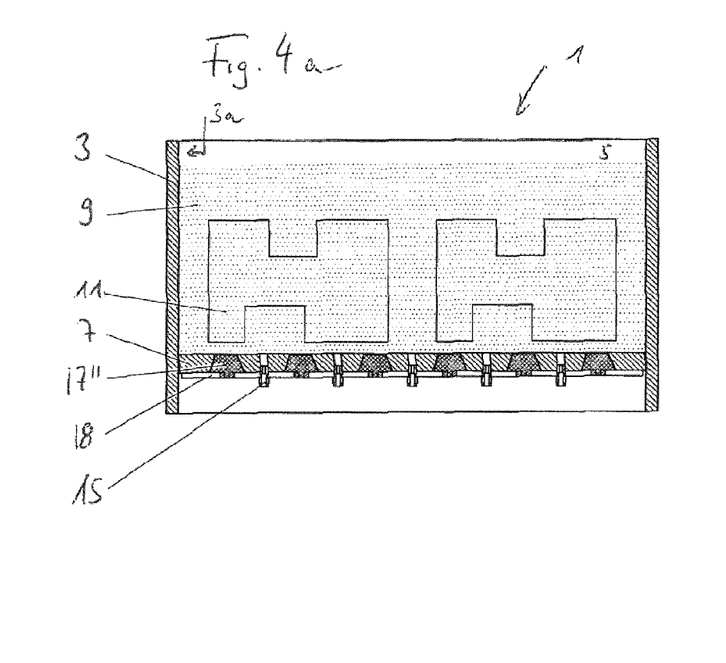
FIG. 4a and FIG. 4b schematically show a method and a device for unpacking a component according to a fourth embodiment of the invention, wherein the closing mechanism comprises a number of closures corresponding to the number of through-holes of the construction platform, here in the form of plugs.
Figure 4B:
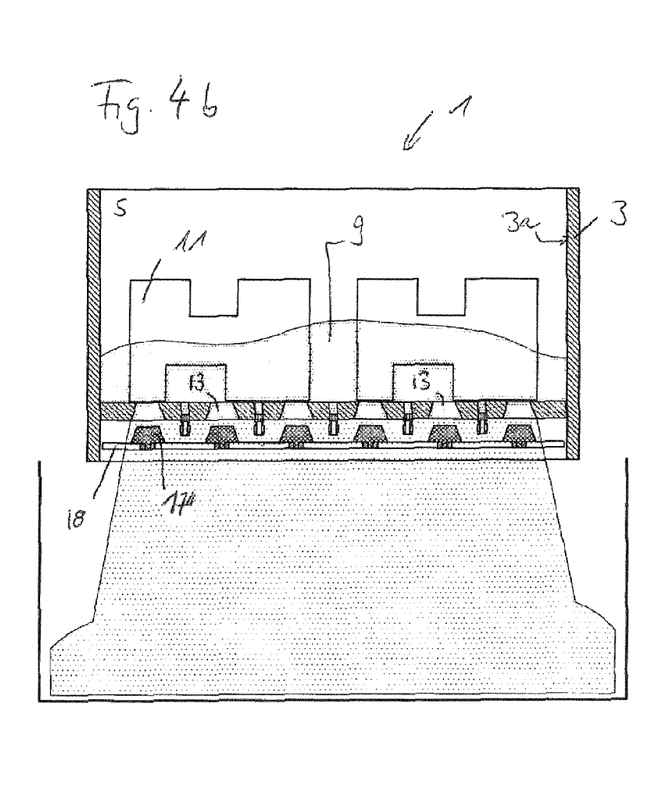

FIGS. 4*a* and 4*b* schematically show another closing mechanism. According to this embodiment of the invention, the closing mechanism has a number of closures corresponding to the number of through-holes 13 of the construction platform 7, here in the form of plugs 17" which are arranged underneath the construction platform. The plugs 17" are formed to selectively close (see FIG. 4*a*) and release (see FIG. 4*b*) a respectively associated particulate material drain through-hole 13, and are vertically movable relative to the construction platform 7 between a closing position, in which the respective plug 17" is received in the associated particulate material drain through-hole, and an opening position, in which the respective closure is moved downwards out of the associated particulate material drain through hole 13 and releases the associated particulate material drain through-hole 13. The plugs 17" are moved relative to the construction platform 7 from the closing position into the opening position, so as to let the fluidized, unconsolidated particulate material drain off downwards through the particulate material drain through-holes 13. Here, the plugs can be moved together from the closing position to the opening position by being mechanically connected/coupled, here through an arrangement of rods or a plate 18. In the closing position, the plugs 17" may seal directly against at least a part of the respective hole circumferential wall (or abut against it) or may alternatively form an annular gap relative thereto, which is sufficiently small to prevent the particulate material from draining off (for example due to the fact that the annular gap does not let pass any particulate material or due to the fact that the annular gap is covered by particulate material or is blocked or due to the fact that the annular gap results in/contributes to the generation of a bulk cone which is formed underneath the construction platform and prevents a (further) draining of the particulate material). As shown in FIGS. 4*a* and 4*b*, the particulate material drain through-holes 13 may be formed to be cone-shaped according to this embodiment; in this respect, the respective opening is tapered in an upward direction. In this context, the respective plug may, for example, also be formed to be cone-shaped, for example contrary to the associated hole 13. For example, the respective plug may be made of rubber.

In an alternative embodiment which is not shown, the closures may, for example, be formed as disks or covers which are arranged under or above the construction platform 7 instead of the plugs, and which cover the holes 13 in the closing position and thereby prevent the particulate material from draining off.

The foregoing description of specific exemplary embodiments of the present invention has been presented for purposes of illustration and description. It is not intended to be exhaustive or to limit the invention to the precise forms disclosed, and obviously many modifications and variations are possible in light of the above teachings. The scope of the invention is to be defined by the Claims appended hereto and their equivalents.

What is claimed is:

1. A method for unpacking a component produced by means of an additive manufacturing method from a particulate material fill of loose, unconsolidated particulate material, which fill is arranged in a construction space together with the component and surrounds the component, wherein the construction space is delimited downward by a construction platform on which the particulate material fill containing the component is arranged, wherein, for unpacking the component, the particulate material fill surrounding the component is transferred into a fluidized bed, so that the loose, unconsolidated particulate material is fluidized, and the fluidized, unconsolidated particulate material is drained downward through the construction platform off the construction space, wherein for generating the fluidized bed, a fluid is introduced through the construction platform, into the particulate material fill from below in such a way that the particulate material fill is flown-through by the fluid bottom-up, and that the loose, unconsolidated particulate material is loosened up by means of the fluid and is fluidized, thereby forming a fluidized bed, and wherein one or more particulate material drain through-holes are formed in the construction platform, which can be closed and opened selectively by means of a closing mechanism, and wherein the one or more particulate material drain through-holes are opened by means of the closing mechanism for draining the fluidized, unconsolidated particulate material, so that the fluidized, unconsolidated particulate material drains off downward through the one or more particulate material drain through-holes.

2. The method according to claim 1, wherein the closing mechanism comprises a perforated sheet or a perforated plate which is arranged substantially parallel to the construction platform, comprises one or more through-holes and can be moved relative to the construction platform between a closing position and an opening position, wherein the perforated sheet or the perforated plate is moved relative to the construction platform into the opening position, so as to let the fluidized, unconsolidated particulate material drain off downward through the one or more particulate material drain through-holes.

3. The method according to claim 1, wherein the closing mechanism comprises one or more rotary disks which are arranged rotatably on the lower side of the construction platform, which are each rotatably movable between a first rotational position and a second rotational position and which each comprise a plurality of through-holes, which are aligned with a plurality of associated particulate material drain through-holes in the first rotational position and which are covered by the construction platform in the second rotational position, so that the associated particulate material drain through-holes are closed, wherein the one or more rotary disks are rotated from the second rotational position into the first rotational position, so as to open the particulate material drain through-holes and let the fluidized, unconsolidated particulate material drain off downward through the particulate material drain through-holes and the through-holes.

4. The method according to claim 1, wherein the closing mechanism comprises a number of closures corresponding to the number of particulate material drain through-holes, which are configured to selectively close and release a respectively associated particulate material drain through-hole, and which, relative to the construction platform, are vertically and/or horizontally movable between a closing position in which the respective closure closes the associated particulate material drain through-hole and an opening position in which the respective closure releases the associated particulate material drain through-hole, wherein the closures are moved relative to the construction platform from the closing position into the opening position, so as to let the fluidized, unconsolidated particulate material drain off downward through the one or more particulate material drain through-holes.

5. The method according to claim 1, wherein the fluidized, unconsolidated particulate material drains downward through the construction platform or rather the particulate material drain holes off the construction space in a suction-free manner.

6. The method according to claim 1, wherein, in order to unpack the component, the fluidized, unconsolidated particulate material is drained downward off the construction space predominantly or exclusively through the construction platform or rather the particulate material drain through-holes.

7. The method according to claim 1, wherein the construction platform comprises a plurality of fluid inlet openings through which the fluid is introduced from the construction platform into the particulate material fill.

8. The method according to claim 1, wherein the construction platform comprises a plurality of fluid introducing nozzles, by means of which the fluid is introduced into the particulate material fill.

9. The method according to claim 1, wherein the construction platform is configured to be porous at least in sections, and wherein the fluid is introduced through pores of the construction platform into the particulate material fill.

10. The method according to claim 1, wherein the fluid is introduced into the particulate material fill from below in an impulsive way, thereby generating several chronologically successive fluid impulses, so as to loosen and fluidize the unconsolidated particulate material, thereby forming the fluidized bed.

11. A device for unpacking a component produced by means of an additive manufacturing method from a particulate material fill of unconsolidated particulate material which fill is arranged in a construction space together with the component and surrounds the component, comprising:
   a construction box, having
      a vertical circumferential wall by which a construction space arranged in an interior space of the construction box is delimited on a circumferential side,
      a construction platform delimiting the construction space downward,
      wherein in the construction platform one or more particulate material drain through-holes are formed for draining fluidized, unconsolidated particulate material off the construction box, and
      a closing mechanism configured to selectively close and open the one or more particulate material drain through-holes,
   a fluidized bed generating device adapted to transfer a particulate material fill of loose, unconsolidated particulate material received in the construction space and surrounding the component into a fluidized bed, so that the loose, unconsolidated particulate material is fluidized and the fluidized, unconsolidated particulate material can be drained downward off the construction space, wherein the fluidized bed generating device comprises a fluid introducing device adapted to introduce a fluid through the construction platform, into the particulate material fill from below for generating the fluidized bed in such a manner that the particulate material fill is flown-through by the introduced fluid bottom-up, and that loose, unconsolidated particulate material is loosened by means of the introduced fluid and is fluidized, thereby forming a fluidized bed, and
   a control device configured so as to control the fluidized bed generating device for unpacking the component in such a way that it transfers the particulate material fill surrounding the component into a fluidized bed, so that the loose, unconsolidated particulate material is fluidized and the fluidized, unconsolidated particulate material can be drained downward off the construction space.

12. The device according to claim 11, wherein the control device is further configured so as to control the closing mechanism for unpacking the component in such a way that the latter opens the one or more particulate material drain through-holes, so that the fluidized, unconsolidated particulate material can drain downward off the construction space.

13. The device according to claim 11, wherein the one or more particulate material drain through-holes are formed to be suction device-free, so that, after opening the particulate material drain through-holes, the fluidized, unconsolidated particulate material drains off the construction box in a suction-free way through the particulate material drain through-holes.

14. The device according to claim 11, wherein the inner side of the vertical circumferential wall is configured free from particulate material drain through-holes, so that, for unpacking the component, the fluidized, unconsolidated particulate material may be discharged from the construction space exclusively downward.

15. The device according to claim 11,
   wherein the construction platform comprises a plurality of fluid inlet openings through which the fluid can be introduced from the construction platform into the particulate material fill, and/or
   wherein the fluid introducing device comprises a plurality of fluid introducing nozzles which are integrated into the construction platform and adapted to introduce the fluid into the particulate material fill, and/or
   wherein the construction platform is formed to be porous at least in sections, thereby partially forming the fluid introducing device, so that fluid can be introduced into the particulate material fill through pores of the construction platform.

16. The device according to claim 11, wherein the control device is further configured to control the fluid introducing device in such a way that the latter introduces the fluid in an impulsive way from below into the particulate material fill, thereby generating several chronologically successive fluid impulses, so as to loosen up and fluidize the fluid, thereby generating the fluidized bed.

* * * * *